J. W. TUFTS & M. S. ANDREWS.
Manufacture of Electrotype Dies.
No. 221,985.   Patented Nov. 25, 1879.
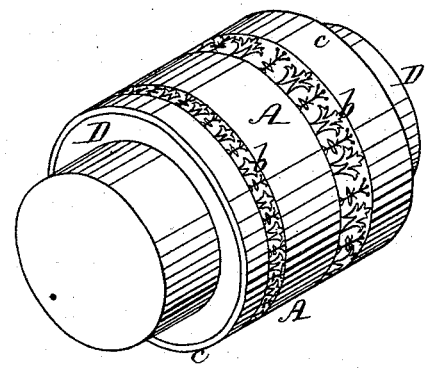
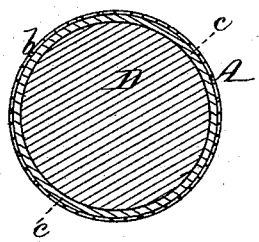
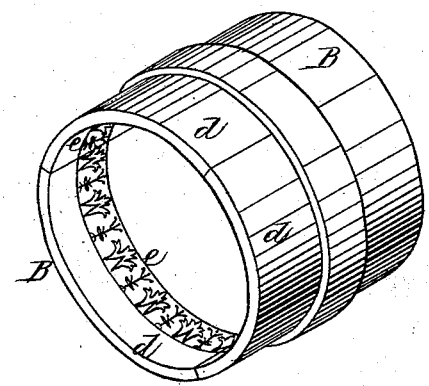

UNITED STATES PATENT OFFICE.

JAMES W. TUFTS, OF MEDFORD, AND MATTHEW S. ANDREWS, OF SOMERVILLE, MASSACHUSETTS, ASSIGNORS TO SAID TUFTS.

IMPROVEMENT IN THE MANUFACTURE OF ELECTROTYPE-DIES.

Specification forming part of Letters Patent No. 221,985, dated November 25, 1879; application filed June 30, 1879.

*To all whom it may concern:*

Be it known that we, JAMES W. TUFTS, of Medford, and MATTHEW S. ANDREWS, of Somerville, both in the county of Middlesex and State of Massachusetts, have invented certain Improvements in Electrotype-Dies for producing ornamental designs upon britannia and other soft metals, of which the following is a full, clear, and exact description, reference being had to the accompanying drawings, making part of this specification, in which—

Figure 1 is a perspective view of a cylindrical die made by the electrotype process and mounted on a hard-metal mandrel in accordance with our invention. Fig. 2 is a transverse section through the same. Fig. 3 is a perspective view of the sectional mold in which is made the tubular electrotype which forms the face of the die.

Ornamental designs have heretofore been produced upon britannia and other soft metals to be afterward plated by means of engraved steel rolls or dies. The engraving of these rolls or dies, however, not only involves great expense, but the impressions made thereby on the soft metal do not resemble hand-engraving, which is too expensive for ordinary grades of work.

Our invention has for its object to enable us to produce at a comparatively insignificant cost a die by means of which a clear and sharp impression undistinguishable from hand-engraving may be made upon soft metal.

Our invention consists in producing a cylindrical die by forming, in a sectional mold, a tubular electrotype-face bearing the design, turning or boring out the electrotype, and afterward fitting and securing it upon a hard-metal mandrel or core, as hereinafter more specifically described and claimed.

In the said drawings, A represents a cylindrical die, bearing on its exterior surface or periphery an ornamental design, *b*, for producing a corresponding figure or counterpart upon a piece of soft metal by means of a heavy pressure, in a well-known manner. The outer portion or face of this die A consists of a tube, *c*, of copper or other suitable metal, produced by the electrotype process in the following manner:

B is a brass or other metal tube, which is cut longitudinally into a number of sections, *d*, (preferably three,) in order to facilitate the cutting or engraving of an ornamental design, *e*, on its interior surface, which could not otherwise be readily accomplished. After the design *e* has been cut on the inner surface of the sections *d* they are put together and united by solder or otherwise, forming a tubular mold, which is then suspended in the decomposing-trough containing the necessary solution, and connected with the battery in the usual manner, where it is allowed to remain until a sufficient thickness of metal has been deposited on its interior surface to form the tube *c*, the exterior surface of the mold being protected from deposit by varnish, wax, or other suitable substance. The mold B is then removed from the trough, and the interior of the electrotype *c* therein turned or bored out smooth in a lathe, after which the sections *d* of the mold are separated and removed, and the electrotype slipped over a steel or other hard-metal mandrel or core, D, turned to exactly fit the interior of the electrotype, which is secured thereto by solder.

The mandrel D thus forms a rigid and unyielding backing, which gives the electrotype-face *c* of the die the necessary stiffness to render it durable, and entirely prevents even the finest raised lines of the design from being crushed or injured in any way while subjected to the heavy pressure required in producing the corresponding figure upon the soft metal in contact with the die.

Instead of making the mold B in sections, as above described, it may be composed of a single strip of metal, bent into a circular form after the device has been engraved thereon.

An electrotype-die, however, can be made with the finest and most delicate lines in relief or in intaglio, and by uniting it with a hard-metal backing it is rendered capable of producing the exact counterpart of its design in soft metal, with lines so sharp and clearly defined as to render it impossible to distinguish the work from the best hand-engraving.

What we claim as our invention, and desire to secure by Letters Patent, is—

The method, substantially as described, of producing a cylindrical die by forming in a divided or sectional mold, B, a tubular electrotype-face, c, bearing the design, turning or boring out the electrotype, and afterward fitting and securing it upon a hard-metal mandrel or core, D, which forms a backing therefor, as set forth.

Witness our hands this 19th day of June, A. D. 1879.

JAMES W. TUFTS.
MATTHEW S. ANDREWS.

In presence of—
P. E. TESCHEMACHER,
JAMES N. NORTH.